US008549505B2

(12) United States Patent
Kimura

(10) Patent No.: US 8,549,505 B2
(45) Date of Patent: Oct. 1, 2013

(54) PROFILING METHOD, SYSTEM, AND RECORDING MEDIUM HAVING A PROFILING PROGRAM

(75) Inventor: Shigeru Kimura, Tokyo (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1080 days.

(21) Appl. No.: 12/542,325

(22) Filed: Aug. 17, 2009

(65) Prior Publication Data

US 2010/0077388 A1    Mar. 25, 2010

(30) Foreign Application Priority Data

Sep. 25, 2008   (JP) ................................ 2008-245787

(51) Int. Cl.
   *G06F 9/45*    (2006.01)
(52) U.S. Cl.
   USPC ........................... 717/158; 717/163; 717/164
(58) Field of Classification Search
   USPC .................................................. 717/136–166
   See application file for complete search history.

(56) References Cited

U.S. PATENT DOCUMENTS

| | | | | |
|---|---|---|---|---|
| 6,026,234 | A * | 2/2000 | Hanson et al. | 717/133 |
| 6,202,205 | B1 * | 3/2001 | Saboff et al. | 717/151 |
| 2004/0268316 | A1 * | 12/2004 | Fisher et al. | 717/130 |
| 2007/0234298 | A1 * | 10/2007 | Hirai et al. | 717/124 |
| 2007/0234299 | A1 | 10/2007 | Watanabe | |
| 2008/0209403 | A1 | 8/2008 | Kimura | |
| 2008/0282232 | A1 * | 11/2008 | Cong et al. | 717/127 |

FOREIGN PATENT DOCUMENTS

| | | |
|---|---|---|
| JP | 8-147199 | 6/1996 |
| JP | 2007-233855 | 9/2007 |
| JP | 2007-272692 | 10/2007 |
| JP | 2008-210011 | 9/2008 |

OTHER PUBLICATIONS

Xu et al., Performance Analysis of a Software Design Using the UML Profile for Schedulability, Performance, and Time, P. Kemper and W.H. Sanders (Eds.): Tools 2003, LNCS 2794, Springer-Verlag Berlin Heidelberg 2003, pp. 291-307.*
Musa, The Operational Profile in Software Reliability Engineering: An Overview, 1992 IEEE, pp. 140-154.*
Elbaum et al., Profiling Deployed Software: Assessing Strategies and Testing Opportunities, 2005 IEEE, pp. 312-327.*
Japanese Office Action issued Nov. 6, 2012 in corresponding Japanese Patent Application No. 2008-245787.

* cited by examiner

*Primary Examiner* — Wei Zhen
*Assistant Examiner* — Satish Rampuria
(74) *Attorney, Agent, or Firm* — Staas & Halsey LLP

(57) ABSTRACT

A profiling method executed by a computer and system including generating a source code by adding a call instruction for a profile acquisition function to a source program of an application, generating an execution form of a profiling target program by linking a library of profile acquisition functions to the source code, executing the profiling target program in an operating system of a target system, calling a profile acquisition driver by executing the call instruction of the profile acquisition function via the library of the profile acquisition functions, and acquiring sampling information on an execution status of the profiling target program based on an interrupt occurrence by the profile acquisition driver.

18 Claims, 14 Drawing Sheets

FIG.4

| INTERRUPT ADDRESS | THE NUMBER OF INTERRUPTS |
|---|---|
| 00001000 | 00000001 |
| 00001004 | 00000039 |
| 00001008 | 00000080 |

FIG.8

```
FR-V sampler on Linux     V2.0     Tue Mar 22 19:11:48 2007
............................................................
Sampling module file             :  lib_sub.so
Sampling interval micro seconds  :         50
Sampling total counts            :     538289
............................................................
   counts(%)       : function-name,code-size
   53829( 10.0%) : FuncS,208
   50995(  9.5%) : FuncR,208
   48161(  8.9%) : FuncQ,208
   45328(  8.4%) : FuncP,208
   42497(  7.9%) : FuncO,208
   39663(  7.4%) : FuncN,208
   36830(  6.8%) : FuncM,208
   33996(  6.3%) : FuncL,208
   31164(  5.8%) : FuncK,208
   28332(  5.3%) : FuncJ,208
   25498(  4.7%) : FuncI,208
   22665(  4.2%) : FuncH,208
   19833(  3.7%) : FuncG,208
   16999(  3.2%) : FuncF,208
   14166(  2.6%) : FuncE,208
   11332(  2.1%) : FuncD,208
    8500(  1.6%) : FuncC,208
    5667(  1.1%) : FuncB,208
    2834(  0.5%) : FuncA,208
```

FR-V sampler on Linux   V2.0   Tue Mar 22 19:10:38 2007
......................................................
Sampling interval micro seconds  :      50
Sampling total counts            :   595924
......................................................
    counts(%)      : Sampling module file
  538289( 90.3%) : ./lib_sub.so
   57606(  9.7%) : ./lib_func.so
      18(  0.0%) : /lib/ld.so.1
       8(  0.0%) : /lib/libc.so.6
       3(  0.0%) : /lib/libpthread.so.0
       0(  0.0%) : <Main program>
       0(  0.0%) : /lib/libdl.so.2
       0(  0.0%) : ../../../fj_sampler/libfj_sampler.so

FIG.10

FR-V sampler on Linux function-detail V1.0   Tue Sep 14 13:30:35 2007
---------------------------------------------------------------
<Program total count>
         83703( 9.7%)                    : FuncT,80
Sampling interval micro seconds    :       10
---------------------------------------------------------------
<Function detail>
offset:     sampling count ratio(%)
0x00000010:      5928        7.1%
0x00000014:      6460        7.7%
0x00000018:      1009        1.2%
0x0000002C:     58141       69.5%
0x00000030:         8        0.0%
0x00000038:         3        0.0%
0x0000003C:     12154       14.5%

FIG.13

| DATA ADDRESS | THE NUMBER OF INTERRUPTS |
|---|---|
| 00001000 | 00000001 |
| 00001004 | 00000039 |
| 00001008 | 00000080 |
| ⋮ | ⋮ |

14

PROFILING METHOD, SYSTEM, AND RECORDING MEDIUM HAVING A PROFILING PROGRAM

CROSS-REFERENCE TO RELATED APPLICATIONS

This application is based upon and claims the benefit of priority of the prior Japanese Patent Application No. 2008-245787, filed on Sep. 25, 2008, the entire contents of which are incorporated herein by reference.

FIELD

This application relates to a profiling method, system, and a storage medium that stores a profiling program.

BACKGROUND

Profiling methods have been used in computer systems. For example, the following profiling method is known (for example, refer to Japanese Laid-open Patent Publication No. 2007-272692). In the method, a target range assignment interface receives the assignment of an information collection target range from an application program and registers the assignment in a flag management table, and a flag setting interface receives a flag value from the application program and sets the flag value in the flag management table. An interrupt handler records a flag value at that time of the flag management table with an execution address in an interrupt handler record table when the execution address during the occurrence of an interrupt corresponds to any of the information collection target ranges registered in the flag management table.

However, typical profiling methods have problems including following. In an operating system (hereinafter referred to as OS), a profiling target program and a program for profiling the target program are activated as different processes, and a value of a program counter is acquired by generating a system interrupt using a system call for a process monitoring. An interval of a system interrupt is a minimum interrupt time of a system timer. This minimum interrupt time is 10 ms in UNIX (a registered trade mark of The Open Group) and Linux (a trade mark of Linus Torvalds). The system timer consumes a time for system processing. Thus, when a profiling is performed by a minimum interrupt time of the system timer, detailed profile information for each command may not be acquired, although profile information for each function may be acquired.

When multiple processes are executed concurrently in an OS with a virtual storage mechanism and a value of a program counter is acquired, profiling target processes and processes not to be profiled may not be distinguished. Accordingly, acquired profile information includes not only profile information for profiling target programs but also the profile information for programs not to be profiled. In other words, profiling information only for profiling target programs may not be acquired. This applies to a shared library executed among multiple processes and profile information for the shared library executed only by profiling target processes may not be acquired.

SUMMARY

According to an aspect of embodiments, a profiling method executed by a computer includes generating a source code by adding a call instruction for a profile acquisition function to a source program of an application, generating an execution form profiling target program by linking a library of profile acquisition functions to the source code, executing the profiling target program in an operating system of a target system, calling a profile acquisition driver by executing the call instruction of the profile acquisition function via the library of the profile acquisition functions, and acquiring sampling information on execution status of the profiling target program based on an interrupt occurrence by the profile acquisition driver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates a data structure of sampling information stored in a memory area such as illustrated in FIG. 1;

FIG. 8 illustrates an example of an analysis result of an analysis tool such as illustrated in FIG. 1, where an example is output in a two-dimensional text format;

FIG. 9 illustrates another example of an analysis result of an analysis tool such as illustrated in FIG. 1, where an example is output in a two-dimensional text format;

FIG. 10 illustrates an example of an analysis result of an analysis tool such as illustrated in FIG. 1, where an example is output in a two-dimensional text format;

FIG. 13 illustrates data structures of sampling information of data accesses stored in a memory area such as illustrated in FIG. 1.

DESCRIPTION OF EMBODIMENTS

Figure 1:
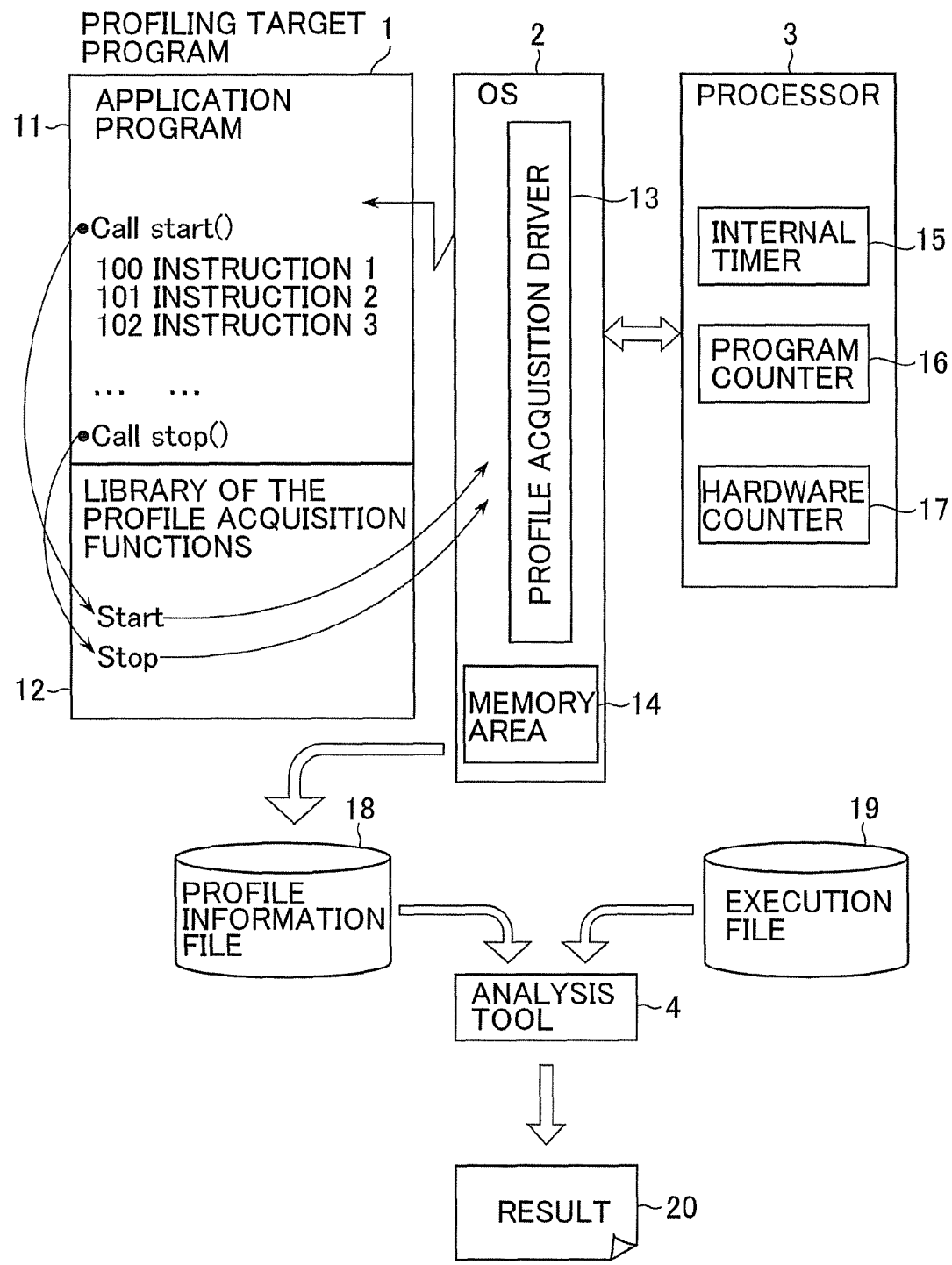
FIG. 1 illustrates a computer system to which a profiling method according to an embodiment is applied.

Reference will now be made in detail to the embodiments, examples of which are illustrated in the accompanying drawings, wherein like reference numerals refer to the like elements throughout. The embodiments are described below to explain the present invention by referring to the figures.

The profiling method, profiling system, and a computer readable medium having a profiling program according to embodiments is described in detail by referring to accompanying drawings. In the following example, a case in which Linux is used as an OS will be described, however, the present disclosure is not limited to any particular operating system and for example, the profiling method and the profiling program may also be applied to Windows (a registered trademark of Microsoft Corporation) or other real-time operating systems.

FIG. 1 illustrates a computer system to which a profiling method according to an embodiment is applied.

As illustrated in FIG. 1, the computer system includes a profiling target program 1, an OS 2, and a processor 3. In the OS, a profiling target application program and a profiling program that acquires sampling information of the profiling target application program are activated in one process. A profile acquisition driver 13 is incorporated beforehand, for example, in the OS 2 to acquire value(s) of a program counter 16 and a hardware counter 17 whenever an internal timer 15 of a processor 3 generates an interrupt. When multiple processes are executed on a virtual storage system, sampling information is acquired only when a process being executed during occurrence of an interrupt is a profiling target process.

A profiling target program 1 is an execution form program and an application program 11 that is a profiling target is linked to a library of profile acquisition functions 12. A call instruction of a profile acquisition function is embedded in the application program 11 that is a profiling target. The call instruction of the profile acquisition function is, for example, "Call start ( )" that instructs to start a profile measurement or "Call stop ( )" that instructs to stop the measurement. The library of profile acquisition functions 12 is a collection of various profile acquisition functions that provide functions for acquiring profile information. The profile acquisition functions are a set of instructions for acquiring a profile, for example, "start" for starting a profile measurement or "stop" for stopping the profile measurement. The profile acquisition function is called by a call instruction for the corresponding profile acquisition function.

In the OS 2, a profile acquisition driver 13 is incorporated. The OS 2 is provided with a memory area 14 for storing data including sampling information. The profile acquisition driver 13 calls an interrupt handler whenever the internal timer 15 of the processor 3 generates an interrupt within a profiling target range specified by profile acquisition functions of "start" and "stop", and stores values of the program counter 16 and the hardware counter 17 such as an event counter of the processor 3 as sampling information in the memory area 14. At this time, the profile acquisition driver 13 acquires sampling information from a program of a profiling target process or a shared library used by the profiling target process among multiple processes executed on the virtual storage system.

The processor 3 includes the internal timer 15, the program counter 16 and the hardware counter 17. The hardware counter 17 counts a number of events generated in the processor 3 and a number of events generated when the processor 3 interacts with external components. Events include a number of execution cycles, cache misses, Translation Look-aside Buffer (TLB) misses, execution instructions, branch instructions executions and specific instructions executions, a cause of a pipeline stall, a cycle of register interferences, bus access information and an instruction parallelism.

The computer system is provided with an analysis tool 4. The analysis tool 4 analyzes profile information based on a profile information file 18 and an execution file 19 and outputs an analysis result 20. The profile information file 18 is created based on the sampling information stored in the memory area 14. The execution file 19 is, for example, the same as the profiling target program 1.

Figure 2:
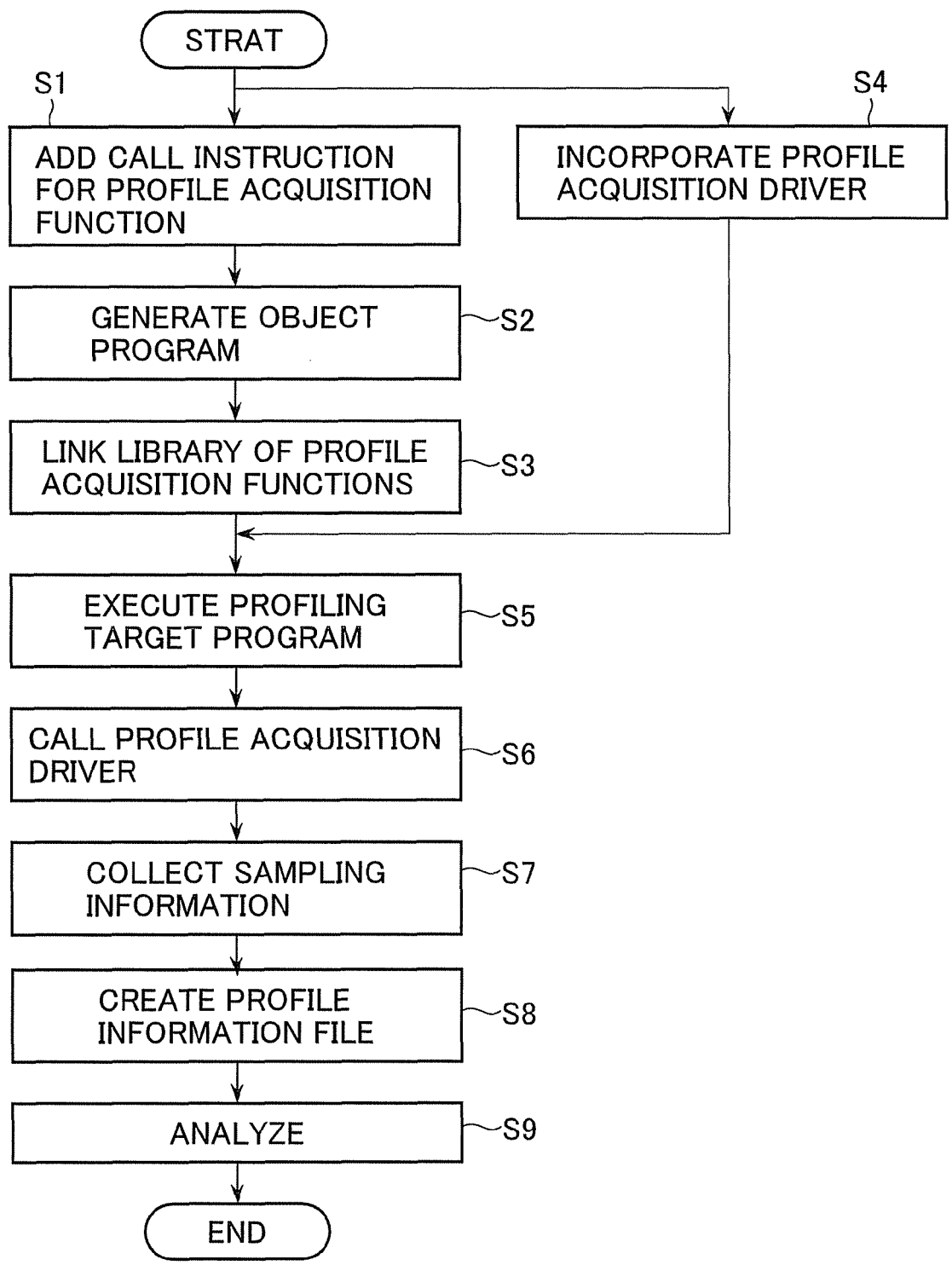
FIG. 2 illustrates processing procedure(s) of the profiling method by a computer system such as illustrated in FIG. 1.

FIG. 2 illustrates processing procedure(s) of a profiling method (process) according to an embodiment. As illustrated in FIG. 2, prior to performing profiling processing for a profiling target application program, a call instruction for a profile acquisition function is added to a source program of the application to create source codes in which the call instruction for the profile acquisition function is embedded (Operation S1). Then an object program is created (generated) by translating the created source codes (Operation S2). Subsequently, a library of profile acquisition functions is linked to the created object program to create a profiling target program (Operation S3). Meanwhile, a profile acquisition driver is created and incorporated in the OS of the target system (Operation S4). The profile acquisition driver may be incorporated into the target system when creating the target system, or incorporated by using an "insmod" command when performing profiling processing.

Then, the profiling target program is executed in the target system (Operation S5). When the program reaches to a start point of the profiling target range, a function for starting a profile measurement is called from the library of profile acquisition functions, and the profile acquisition driver is called by the function (Operation S6). The profile acquisition driver calls an interrupt handler whenever an interrupt is generated by the internal timer of the processor, and acquires values of the program counter and of the hardware counter as sampling information (Operations S7).

The acquired sampling information is stored in a memory area of the OS. In the memory area, an area is secured that may store sampling information corresponding to a size of codes for the profiling target range. The size of codes for the profiling target range is obtained during the link operation in Operation S3 by referring using the profile tool, to a symbol name address defined by a linker script that defines section information and by subtracting a program start symbol (for example, "_start") from a program finish symbol (for example, "_finit"). Thus, a user of the profile tool does not need to explicitly specify the size of program codes. A file for storing sampling information and an interrupt of sampling may be specified by using an environment variable such as a "FJSAMP" or a parameter for a profile acquisition function.

In the operation S7, when multiple processes are executed on the virtual storage system, interrupts may be generated for all processes being executed. In this case, the profile acquisition driver performs processing as illustrated in FIG. 3, and acquires values of the program counter and of the hardware counter for the profiling target process.

Figure 3:
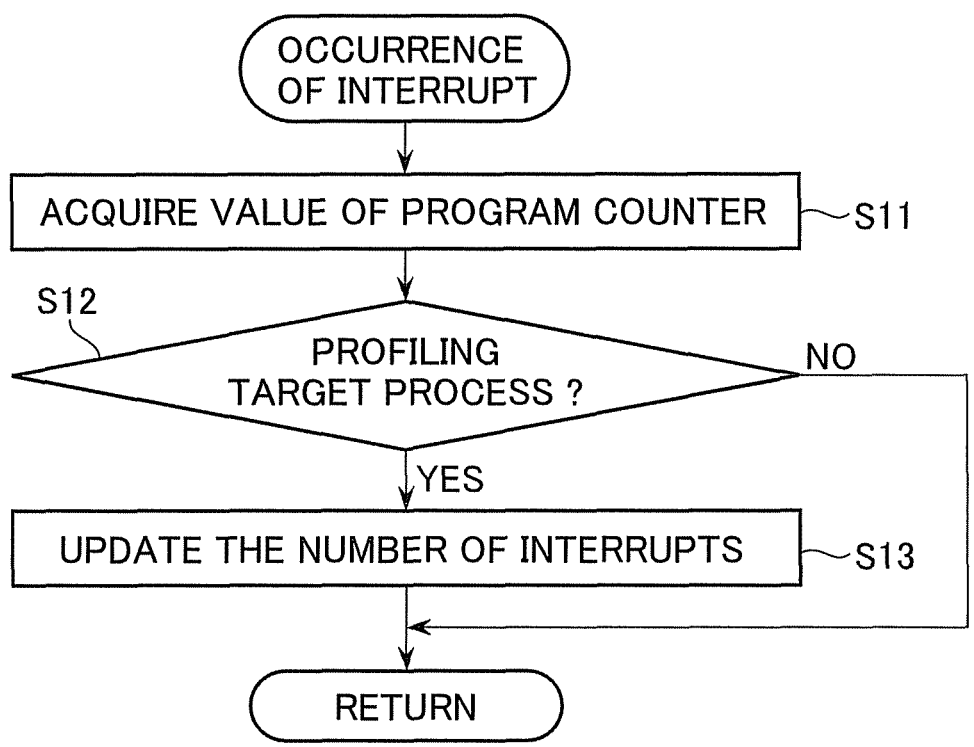
FIG. 3 illustrates procedure(s) related to processing procedure(s) in FIG. 1 for acquiring sampling information for profiling target process(es)

FIG. 3 illustrates procedure(s) for acquiring sampling information for profiling target process(es).

As illustrated in FIG. 3, when an interrupt is generated during execution of a profiling target range, the profile acquisition driver acquires a value of the program counter (Operation S11). The value of the program counter at this time is assumed to be a sampling address. Then, the profile acquisition driver compares a process id of the process being executed when the interrupt is generated and a process id of the profiling target process, and then determines whether or not the process being executed is the profiling target process (Operation S12). The process ids are acquired by the profile acquisition function and passed to the profile acquisition driver. If the process ids match, the process being executed is the profiling target process, and if the process ids are different, the process is not the profiling target process.

If the process being executed matches the profiling target process (Operation S12: Yes), a number of interrupt occurrences is updated by adding 1 to a number of interrupt occurrences corresponds to the sampling address. If the interrupt is the first interrupt for a sampling address, the sampling address does not exist in a memory area. Thus, an area for storing the sampling address and the corresponding interrupt occurrences are set first, and then the number of interrupt occurrences is set to 1 (Operation S13). Subsequently, the operation returns to the caller. If the process being executed is not the profiling target process (Operation S12: No), the operation returns to the caller without updating the number of interrupt occurrences. The same applies to when multiple processes on the virtual system execute the shared library, and only when the process ids match, sampling information on the shared library is acquired.

FIG. 4 illustrates a data structure in a memory area.

As illustrated in FIG. 4, a memory area 14 stores, for each instruction, a sampling address when an interrupt occurs (an interrupt address) and a number of interrupt occurrences at the sampling address (the number of interrupts).

Figure 5:
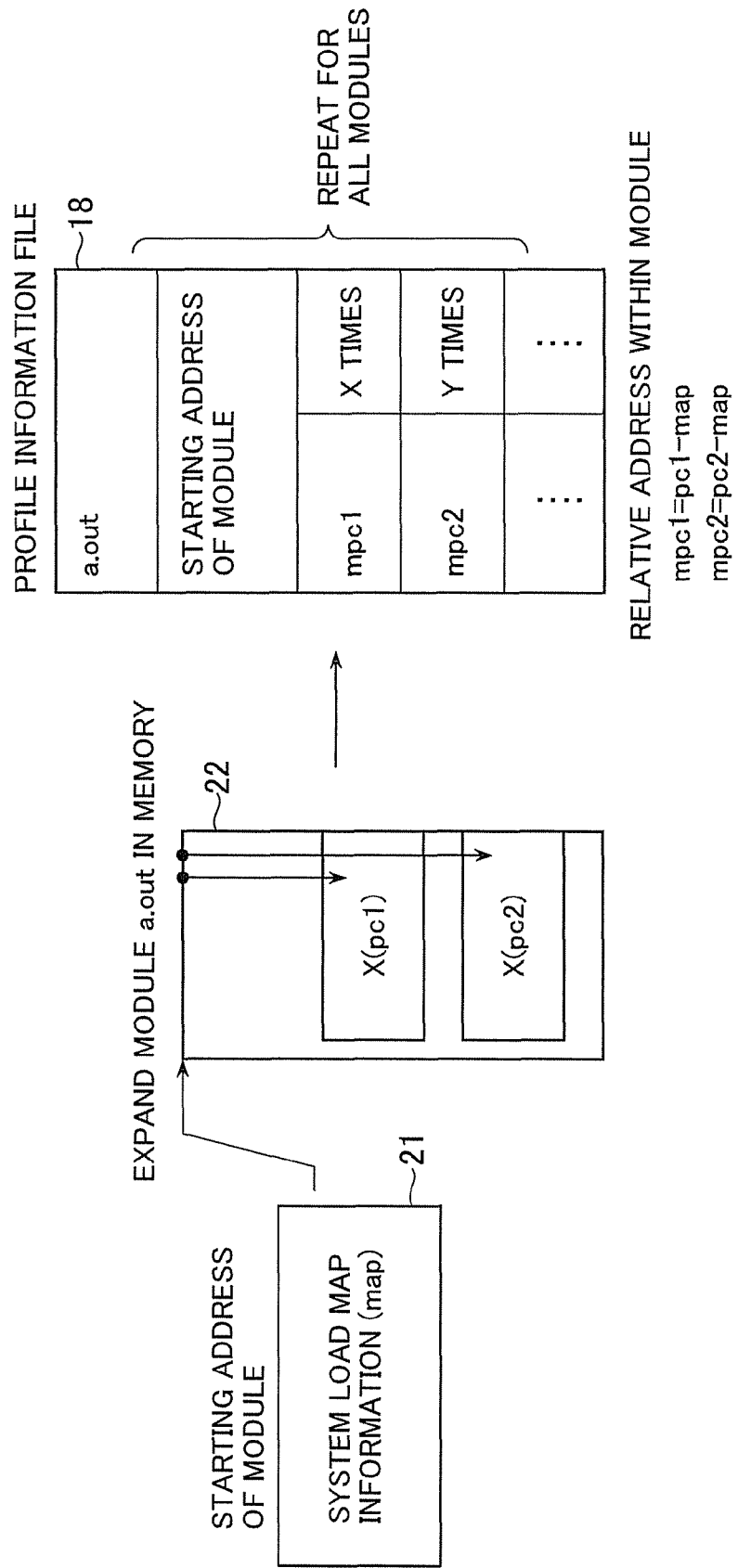
FIG. 5 illustrates relationship between a sampling address and a corresponding module.

Now, back to FIG. 2, when execution of the profiling target program reaches to the end of the profiling target range, a function for ending profile measurement is called from the library of profile acquisition functions. The function outputs sampling information stored in the memory area and creates a profile information file (Operation S8). In the Operation S8, the profile acquisition function determines to which module (including the shared library) the sampling address belongs as illustrated in FIG. 5. Then a starting address of the module and a relative offset address from the starting address of the module are obtained and, for each module, these addresses are stored in the profile information file.

FIG. 5 illustrates a relationship between a sampling address and a corresponding module. In FIG. 5, a starting address of the module that corresponds to the sampling address is obtained from a system load map information 21. The system load map information 21 exists in load module management information and is created when the system performs memory mapping for each load module. In the example illustrated in FIG. 5, when an execution form file ("a.out") is loaded to a system, the system manages an allocation address of the loaded module in the memory 22. If an interrupt occurring at a value of program counter is pc1 while executing the execution form file ("a.out"), a profile information file 18 stores the module name "a.out", the load address in the memory 22 (starting address of module, map), a relative address from the start of module mpc 1(=pc1−map), and the number of interrupt occurrences. The same applies to the shared library.

When profiling processing is performed several times for one profiling target program, a new profile information file may be created by adding sampling results for the same interrupt address in each profile information file acquired for each profiling processing and by linking the multiple profile information files. In order to create a new profile information file, a command for linking (for example, "frvprof-merge") may be prepared. For example, in order to link a profile information file A and a profile information file B to obtain a profile information file C, the following description may be used; "Frvprof-merge a b−o c".

Now back to FIG. 2, when a profile information file is created in Operation S8, the analysis tool determines to which function of module (including the shared library) the sampling address belongs, checks the sampling address against symbol information in the execution form file and then displays the corresponding module name, function name, and sampling information for high cost function, high cost processing, or high cost instruction (Operation S9). The analysis tool associates sampling addresses stored in the profile information file with functions by using a special command (for example, called as "frvprof" command). The "frvprof" command explicitly specifies a name of a load module for which a cost is calculated.

Figure 6:
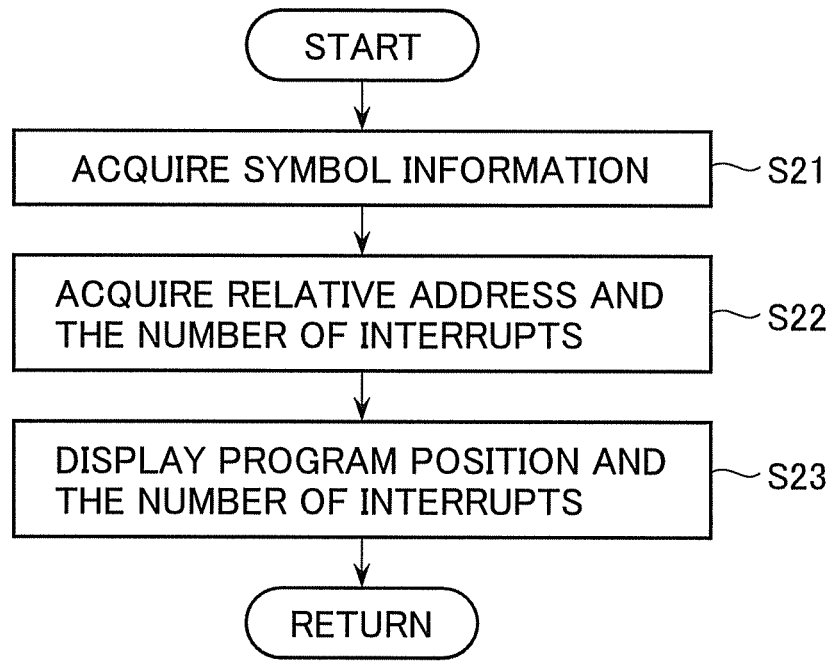
FIG. 6 illustrates an analysis procedure by an analysis tool such as illustrated in FIG. 1.
Figure 7:
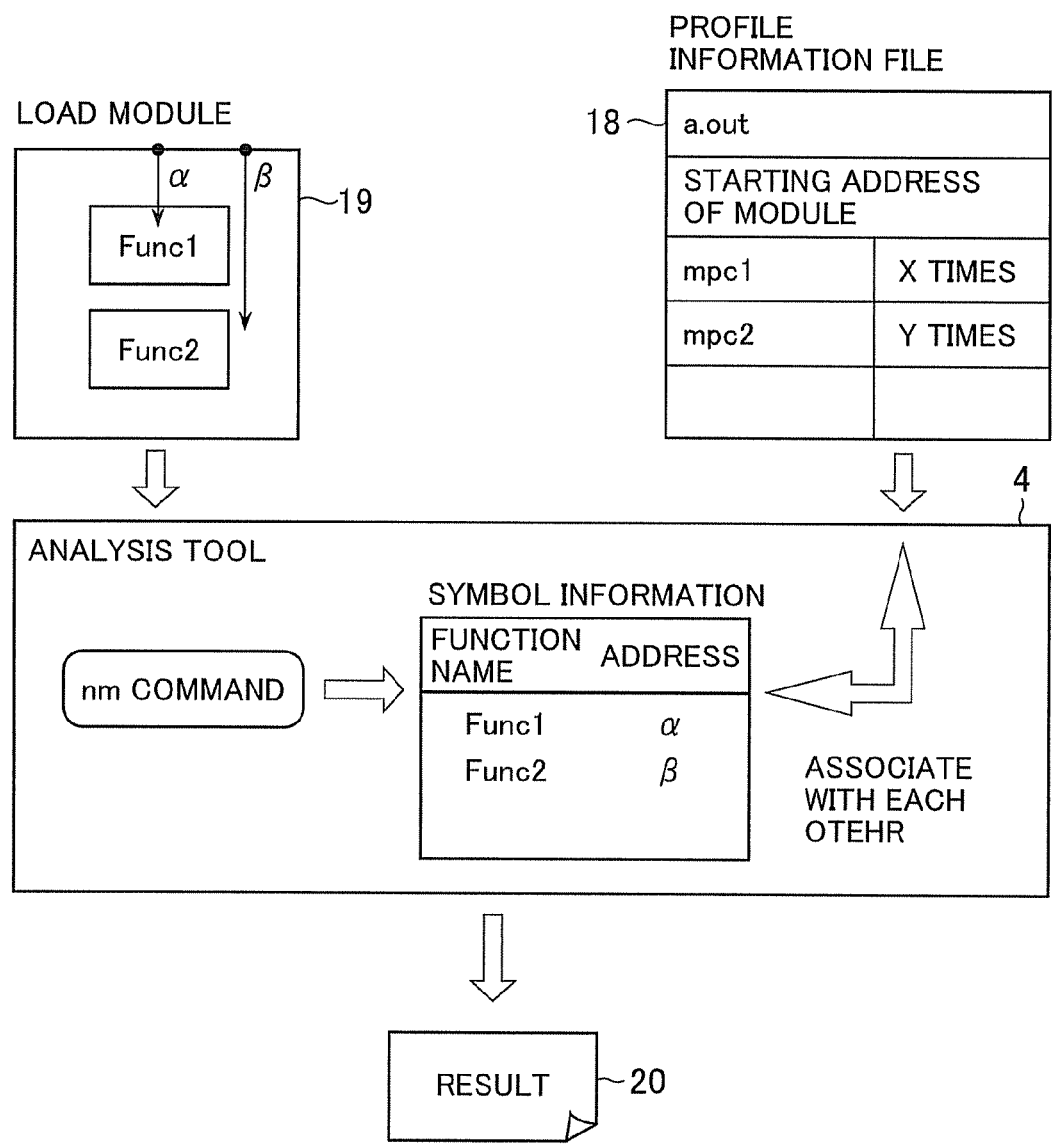
FIG. 7 illustrates processing by an analysis tool such as illustrated in FIG. 1.

FIG. 6 illustrates an analysis procedure by an analysis tool. FIG. 7 illustrates a processing by an analysis tool. As illustrated in FIG. 6 and FIG. 7, when analysis processing starts, an analysis tool 4 acquires symbol information (for example, an address a that corresponds to a function Func 1) in a module by internally activating, for example, a symbol display command ("nm" command), or by using a function for referring to a symbol of a load module (elf access library in UNIX) (Operation S21). Then, the analysis tool 4 acquires a relative address within the module (for example, mpc 1) from the profile information file 18 and the corresponding number of interrupts (Operation S22). Subsequently, the analysis tool 4 checks the relative address within the module (for example, mpc 1) against symbol information within the module (for example, address a that corresponds to the function Func 1) to obtain an offset address (program position) when the interrupt occurs within the corresponding function. Then, the analysis tool 4 displays the program position and the corresponding number of interrupts in two-dimensional or three-dimensional formats (Operation S23), and the program returns to the caller.

The analysis tool 4 may display execution costs for each function or each instruction in the function in any order, for example, in order of the cost or of the definitions onto a monitor of the computer system or to a printer. Output examples of the analysis results are illustrated below; however, output forms are not limited to these.

FIGS. 8 to 10 illustrate examples of analysis results output in two-dimensional text formats.

The analysis result 23 illustrated in FIG. 8 is an example of sampling counts (a number of interrupts) for each function of a common load module ("lib_sub. so") in a descending order. The example in FIG. 8 indicates a function "FuncS" accounts for 10% of the total sampling count and have the highest execution cost. The analysis result 24 in FIG. 9 indicates that an example of sampling count (a number of interrupts) for each load module in an entire program. The example in FIG. 9 indicates that an execution cost of "lib_sub. so" module accounts for 90.3% of an entire program. The analysis result 25 in FIG. 10 indicates an example of execution costs for each instruction. The example in FIG. 10 indicates that an execution cost of an address 2C instruction in a function "FuncT" accounts for 69.5% of an entire function. The output of the analysis result may not be limited to a text format but Graphical User Interface (GUI) may be used to improve operability.

Figure 11:
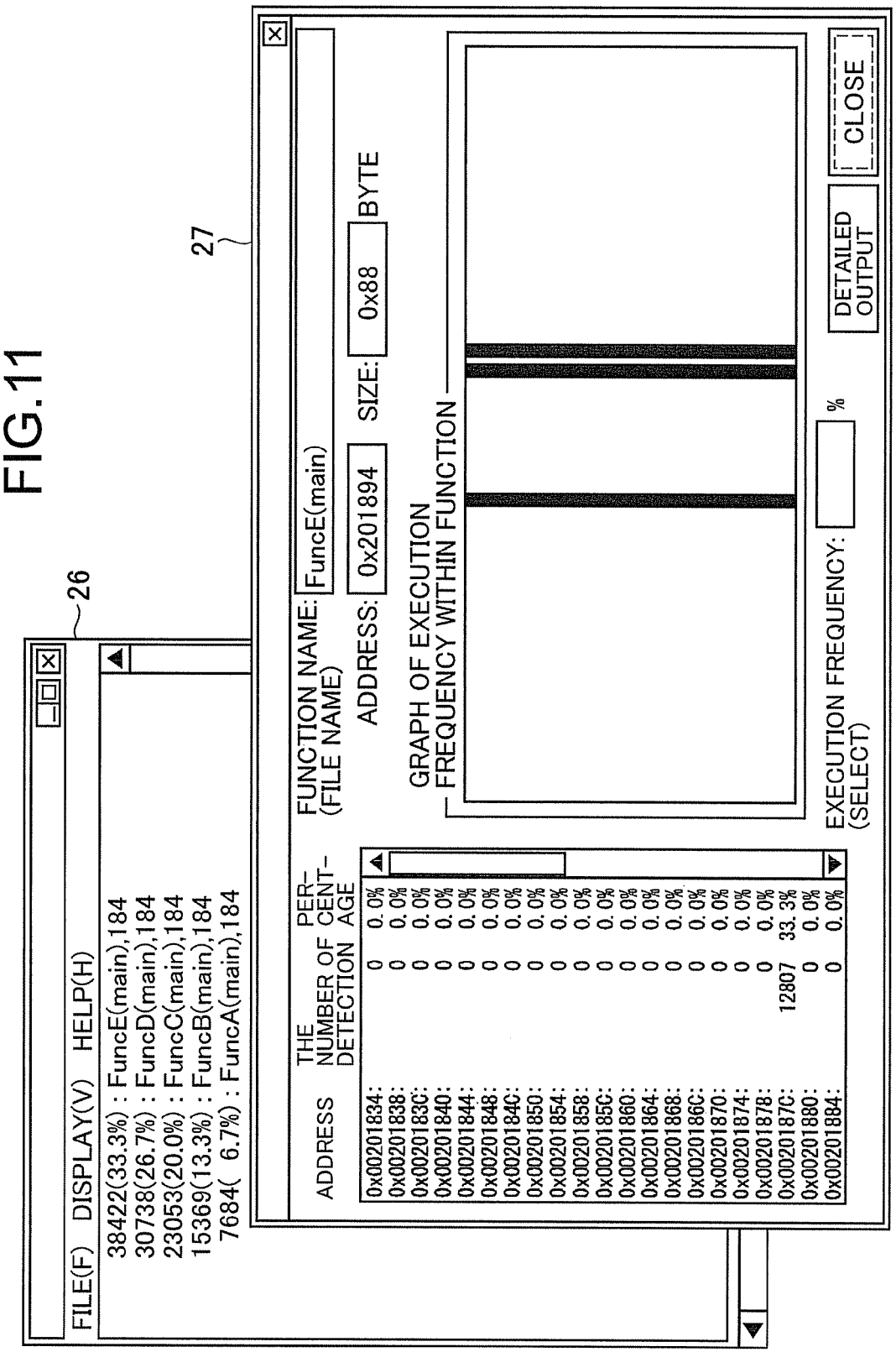
FIG. 11 illustrates an example of an analysis result of an analysis tool such as illustrated in FIG. 1, where an example is output in a two-dimensional GUI.

FIG. 11 illustrates an example of an analysis result output in a two-dimensional GUI. The analysis result 26 in FIG. 11 is an example of sampling counts (a number of interrupts) for each function, for example, in a descending order as in the analysis result 23 in FIG. 8. When one of the displayed functions is selected for checking, for example, by double clicking a mouse, the analysis tool displays more detailed analysis result 27 for instructions in the selected function. The analysis result 27 in FIG. 11 is an example of execution costs for each instruction of the selected function. In the analysis result 27, the horizontal axis of an area "Graph of execution frequency within function" is offsets in the function, and the vertical axis is sampling counts (the number of interrupts). For example, "Graph of execution frequency within function" illustrates that access cost is high around addresses where black stripes are displayed. Operation, for example, double-clicking to select any of instructions displayed in the analysis result 27 activates a debugger, an editor, or a tool to process the corresponding C source or assembler source. Then a bottleneck may be identified and tuning may be performed to the application program. Information on data access cost including the number of data accesses and positions of data definition is acquired by applying the above described profiling method to the target system with the above described structure.

Figure 12:
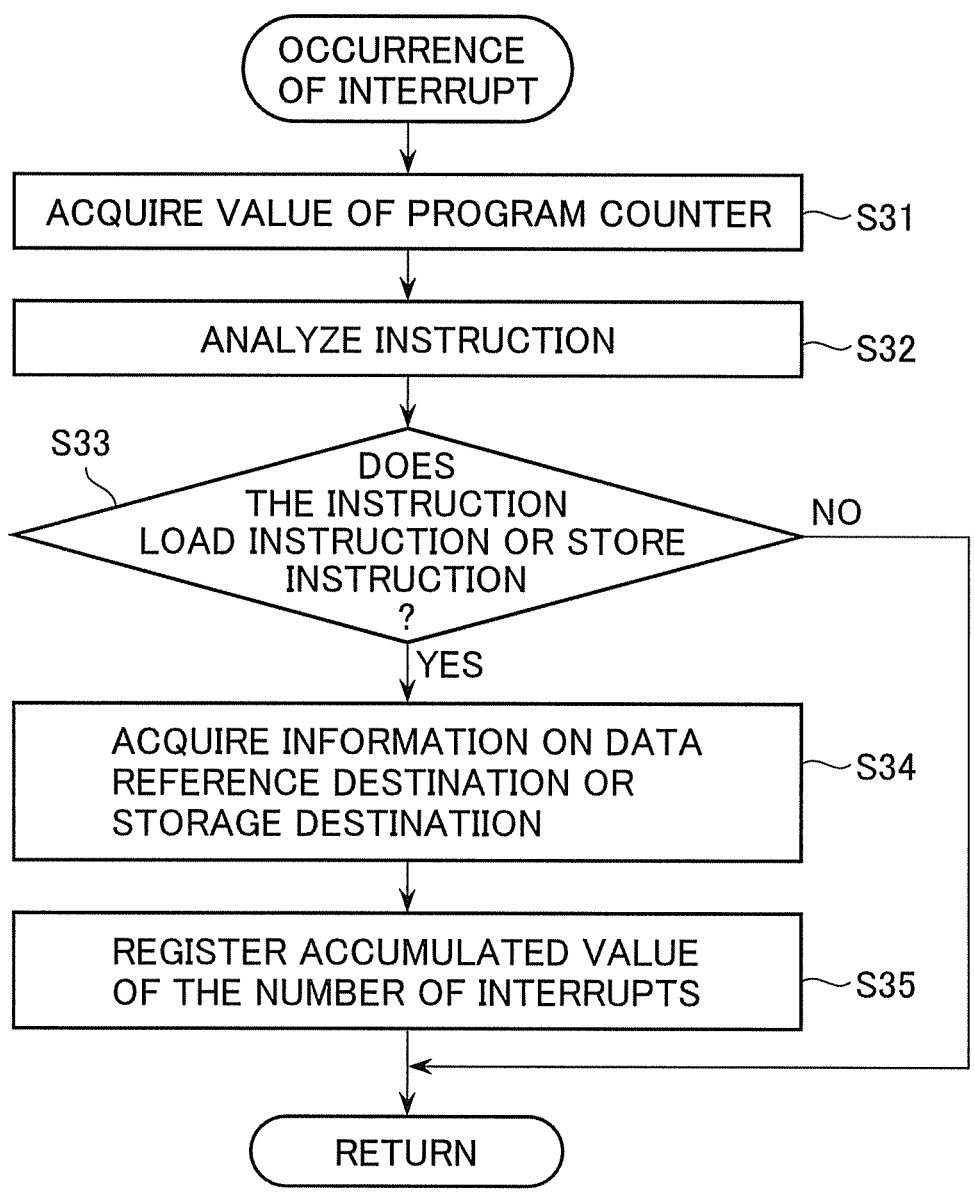
FIG. 12 illustrates procedure(s) for acquiring sampling information of data access by a computer system such as illustrated in FIG. 1.

FIG. 12 illustrates procedure(s) for acquiring sampling information of data access(es). As illustrated in FIG. 12, when an interrupt occurs during execution of a profiling target range, a profile acquisition driver performs the following process. First, the profile acquisition driver acquires a value of a program counter (sampling address) (Operation S31). Then, the profile acquisition driver reads an instruction that corresponds to the sampling address and analyzes the instruction (Operation S32). The profile acquisition driver determines whether the instruction is a load instruction or a store instruction (Operation S33). If the instruction is a load instruction or a store instruction (Operation S33: Yes), the profile acquisition driver disassembles the instruction, and acquires a register number and an immediate value as information indicating reference destination and storage destination of the data (Operation S34). Then, the profile acquisition driver refers to the register value stored in the register number and the register value when an interrupt occurs stored in the OS, and obtains a memory address of the data reference destination or the data storage destination. The profile acquisition driver registers a relative offset of the profiling target data range (data address) and the accumulated values of the number of interrupt occurrences for the relative offset (Operation S35). Then, the operation returns to the caller. If the instruction is neither a load instruction nor a store instruction (Operation S33: No), the operation returns to the caller.

Figure 14:
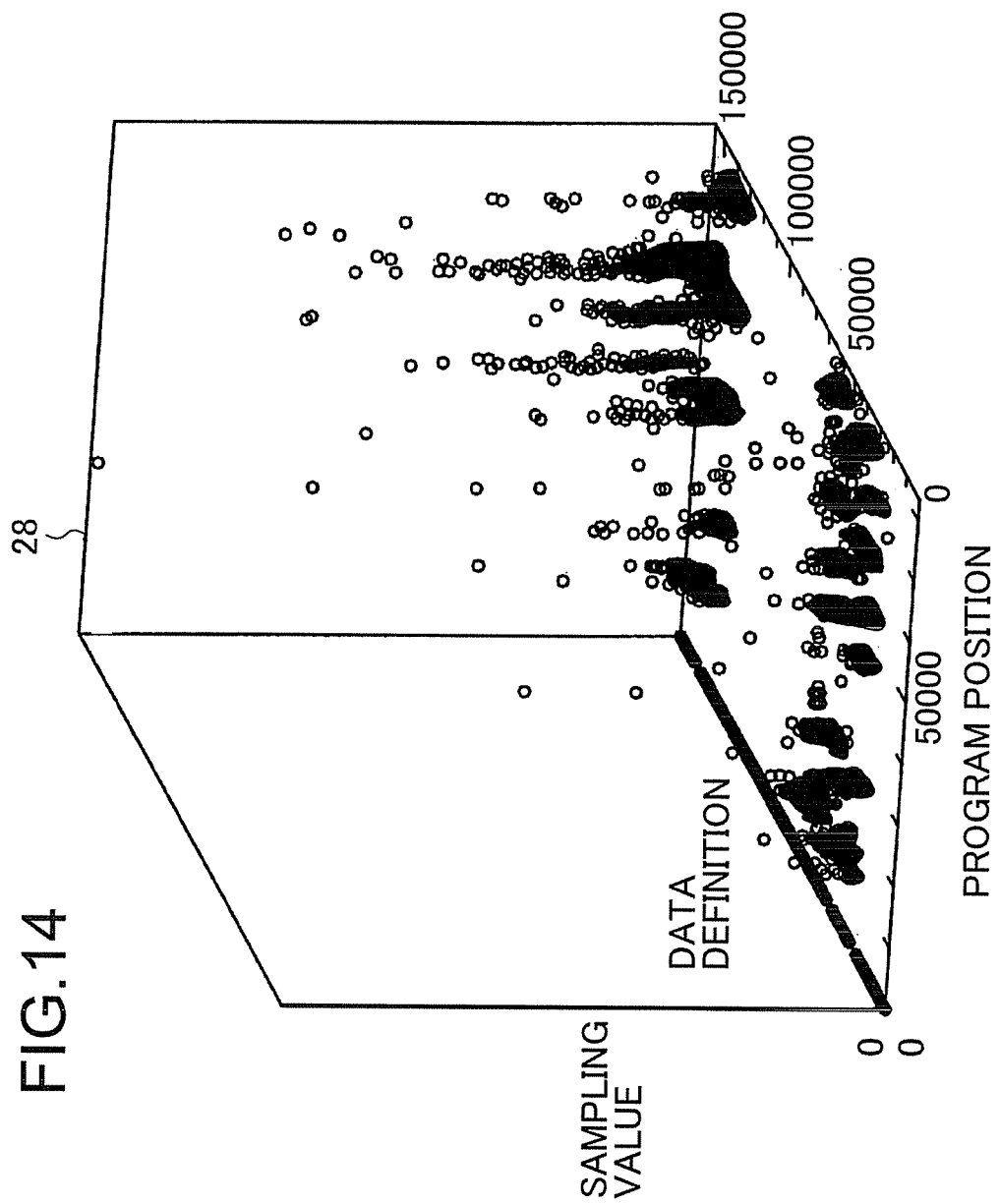
FIG. 14 illustrates an example of an analysis result of an analysis tool such as illustrated in FIG. 1 output in a three-dimensional graph.

FIG. 13 illustrates data structure(s) of sampling information of data access(es) stored in a memory area. As illustrated in FIG. 13, the memory area 14 stores data addresses when interrupts occur in association with the number of interrupt occurrences at the data addresses a number of interrupts). A profile information file is created based on sampling information of data accesses. The analysis tool performs similar processing as the analysis processing illustrated in FIG. 6 and outputs the analysis result. FIG. 14 illustrates an example of an analysis result including sampling information of data accesses.

FIG. 14 illustrates an example of an analysis result output in a three-dimensional graph. The analysis result 28 illustrated in FIG. 14 illustrates an example of information output in three-dimensional format that includes a number of interrupts for addresses indicating, for example, the execution cost of the program, program positions for each function, processing, or instruction, and information on interrupt data accesses such as positions of data definitions or an access cost. The example of FIG. 14 illustrates in which program position, or in which data access position the execution cost is high, thus, a tuning for improving performance or power saving may be applied.

As described above, according to an embodiment, sampling information is acquired with an interval shorter than a minimum interrupt time of the OS, thus, detailed profile information for each instruction may be acquired. Therefore, a program tuning is performed for each instruction. Furthermore, sampling information is acquired in the OS with a virtual storage mechanism while a profiling target process is being executed; thus profile information of the profiling target program (including a shared library) is acquired. Moreover, profiling information that is focused on a shared library is acquired, thus, program tuning focused on the shared library may be performed. Furthermore, profile information focused on a hardware event with an interval shorter than a minimum interrupt time of the OS is acquired. Profile information for data access(es) is acquired with an interval shorter than the minimum interrupt time of the OS, thus, data allocation that takes a memory hierarchy into account may be applied, for example, only high cost variables are extracted and such variables are allocated in a high-speed memory area such as a Random Access Memory (RAM) incorporated in the CPU.

In order to improve performance of the computer system or save power, the following tuning may be performed based on the acquired profiling information. For example, a section may be moved from a Read Only Memory (ROM) to a RAM. Specific work areas such as a data area, a stack area, and a heap area may be allocated to a high-speed memory area such as a RAM incorporated in a CPU. Specific work area may be allocated to a different bank of Synchronous Dynamic Random Access Memory (SDRAM). Specific variable may be allocated to register allocation. High cost variables may be resided in the CPU and cache lock may be applied.

Sampling information may be acquired by a status of an event occurrence of a hardware counter as a trigger. For example, if an event of a data cache miss occurrence of a hardware counter is focused on, an interrupt occurs at an instruction for which the cache miss occurs, thus the access destination of the cache miss is obtained by analyzing the instruction for which the cache miss occurs. At this time, the sampling information may be acquired every time a cache miss occurs, or by generating an interrupt every time the number of occurrences of cache misses reaches a specified number.

The profiling method described in this embodiment may be achieved by causing a computer such as a personal computer or a workstation to execute a prepared program. Such program is stored in a computer-readable storage medium such as a hard disk, a flexible disk, compact disc ROM (CD-ROM), magneto-optical (MO) disk, and digital versatile disk (DVD), and read and executed by a computer. The program may be transmission medium distributable through a network such as the Internet.

According to above described embodiment, detailed profile information for each instruction in the OS is acquired. Moreover, profile information for the profiling target program (including the shared library) in the OS with a virtual storage mechanism is acquired.

According to above described embodiment, an application program and a profiling program that acquires sampling information of the application program are activated in one process. Thus, the sampling information is acquired with an interval shorter than the minimum interrupt time of the OS. The sampling information is acquired while the profiling target process is being executed.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention, the scope of which is defined in the claims and their equivalents.

What is claimed is:

1. A profiling method executed by a computer, the profiling method comprising:
   generating a source code by adding a call instruction for a profile acquisition function to a source program of an application;
   generating an execution form of a profiling target program by linking a library of profile acquisition functions to the source code;
   executing the profiling target program in an operating system of a target system;
   calling a profile acquisition driver by executing the call instruction of the profile acquisition function via the library of the profile acquisition functions; and
   acquiring sampling information on an execution status of the profiling target program based on an interrupt occurrence by the profile acquisition driver,
   wherein sampling information in a shared library is acquired when a profiling target process is executed upon interrupts while a plurality of processes are executed on a virtual storage system and the shared library is executed, and
   wherein the sampling information in the shared library is acquired when a process identifier upon the interrupt matches a process identifier for the profiling target process while the plurality of processes are executed on the virtual storage system and the shared library is executed.

2. The profiling method according to claim 1 comprising:
   incorporating the profile acquisition driver into the target system prior to the executing of the profiling target program in the operating system of the target system.

3. The profiling method according to claim 1, wherein the sampling information is acquired based on occurrence of interrupts while a profiling target process is being executed when a plurality of processes are executed on a virtual storage system.

4. The profiling method according to claim 1, wherein sampling information regarding an execution status of the profiling target process is acquired.

5. The profiling method according to claim 1, wherein the sampling information is acquired by interrupts that are generated based on an internal timer of a processor in the target system with a time shorter than a unit of time of a system timer of the operating system for a profiling target range specified by the profile acquisition function.

6. The profiling method according to claim 1, wherein the sampling information is acquired, the sampling information is acquired by interrupts that are generated based on a hardware counter of a processor in the target system for a profiling target range specified by the profile acquisition function.

7. The profiling method according to claim 1, wherein the acquired sampling information and hardware event information are set as a number of executions in an area that is associated with each instruction.

8. The profiling method according to claim 1, wherein the acquired sampling information and information on data accesses are set as a number of executions in an area that is associated with each instruction.

9. The profiling method according to claim 1, wherein an interrupt address and a number of interrupt occurrences for the interrupt address acquired as the sampling information and information on a load address of a module acquired from operating system information are checked against symbol information of the profiling target program or of the shared library.

10. The profiling method according to claim 1, wherein an interrupt address and a number of hardware events acquired as the sampling information and the information on a load address of a module acquired from the operating system information are checked against symbol information of the profiling target program or of the shared library.

11. The profiling method according to claim 1, wherein an interrupt address and the information on data accesses acquired as the sampling information and information on a load address of a module acquired from the operating system information are checked against symbol information of the profiling target program or of the shared library.

12. The profiling method according to claim 1, wherein the sampling information, hardware event information and information on data accesses are merged.

13. The profiling method according to claim 1, wherein the interrupt occurrence is generated at a time shorter than a unit of time of a system timer of the operating system.

14. A non-transitory computer-readable recording medium adapted to store a program for causing a computer to execute an operation including profiling, comprising:
   executing an execution form of a profiling target program to which a call instruction for a profile acquisition function is embedded and a library of profile acquisition functions is linked in an operating system of a target system;
   calling a profile acquisition driver by executing the call instruction for the profile acquisition function via the library of profile acquisition functions; and
   acquiring sampling information on an execution status of the profiling target program based on an occurrence of an interrupt via the profile acquisition driver,
   wherein sampling information in a shared library is acquired when a profiling target process is executed upon interrupts while a plurality of processes are executed on a virtual storage system and the shared library is executed, and
   wherein the sampling information in the shared library is acquired when a process identifier upon the interrupt matches a process identifier for the profiling target process while the plurality of processes are executed on the virtual storage system and the shared library is executed.

15. The non-transitory computer-readable recording medium according to claim 14, wherein in acquiring the sampling information, the sampling information is acquired while a profiling target process is being executed at an occurrence of interrupts when a plurality of processes are executed on a virtual storage system.

16. The non-transitory computer-readable recording medium according to claim 14, wherein the sampling information regarding an execution status of a shared library is acquired while the profiling target process is being executed at the interrupt occurrence when a plurality of processes are executed on a virtual storage system and a shared library is executed.

17. The non-transitory computer-readable recording medium according to claim 14, wherein the sampling information is acquired by interrupts that are generated based on an internal timer of a processer in the target system with a time shorter than or equal to a unit of time of a system timer of the operating system for a profiling target range specified by the profile acquisition function.

18. The non-transitory computer-readable recording medium according to claim 14, wherein the sampling information is acquired by interrupts that are generated based on a hardware counter of a processer in the target system for a profiling target range specified by the profile acquisition function.

* * * * *